United States Patent [19]
Mendenhall

[11] Patent Number: 6,133,960
[45] Date of Patent: Oct. 17, 2000

[54] FIELD-BASED UPSAMPLING METHOD FOR PERFORMING ZOOM IN A DIGITAL VIDEO SYSTEM

[75] Inventor: Todd C. Mendenhall, San Jose, Calif.

[73] Assignee: LSI Logic Corporation, Milpitas, Calif.

[21] Appl. No.: 09/105,493

[22] Filed: Jun. 26, 1998

[51] Int. Cl.$^7$ ................................................ H04N 9/09
[52] U.S. Cl. .................. 348/561; 348/571; 348/581; 348/704; 345/127; 345/130
[58] Field of Search ................................ 348/561, 562, 348/581, 441, 704, 571, 807, 463, 474; 345/127, 130, 131; H04N 9/09

[56] References Cited

U.S. PATENT DOCUMENTS

| | | | |
|---|---|---|---|
| 4,956,707 | 9/1990 | Oakley et al. | 348/441 |
| 5,276,515 | 1/1994 | Katsumata | 348/571 |
| 5,402,187 | 3/1995 | Ezaki | 348/474 |
| 5,459,477 | 10/1995 | Fukuda et al. | 345/1 |
| 5,469,223 | 11/1995 | Kimura | 348/581 |
| 5,712,689 | 1/1998 | Yasuki et al. | 348/561 |
| 5,719,594 | 2/1998 | Potu | 345/130 |
| 5,751,375 | 5/1998 | Ninomiya et al. | 348/571 |
| 5,793,447 | 8/1998 | Fujiwara et al. | 348/807 |
| 5,798,792 | 8/1998 | Kusaka et al. | 348/264 |
| 5,838,840 | 11/1998 | King | 348/463 |
| 5,896,178 | 4/1999 | Inoue | 348/446 |
| 5,912,710 | 1/1999 | Fujimoto | 348/581 |

*Primary Examiner*—Mark R. Powell
*Assistant Examiner*—Wesner Sajous
*Attorney, Agent, or Firm*—Conley, Rose & Tayon, PC; B. Noel Kivlin

[57] ABSTRACT

A video processing system that processes vertical column of pixels from individual fields is disclosed. The video processing system processes pixels from an even field independent of the pixels in the odd field, and vice versa. The video processing system preferably includes a system memory for storing fields of input video images and a vertical filter coupled to the system memory via a data bus. The field data is retrieved from the system memory by the vertical filter and processed as individual fields. The vertical filter preferably calculates a 2x enlargement of the input image, although the filter can be adapted to enlarge by different factors if desired. The enlargement process generally involves representing an input image with twice as many lines of pixels values as the initial image. The values that are used to represent the enlarged pixels are preferably weighted averages of the pixels from an input pixel field. The vertical filter calculates the weighted averages using coefficients that are based on the proximity of the resulting enlarged pixel values to the corresponding pixels from the input field.

2 Claims, 5 Drawing Sheets

Fig. 7 line1 → X Y1    X    X    X
    C1—O        C1—O line2 → X Y2    X    X    X line3 → X Y3    X    X    X
    C2—O        C2—O line4 → X Y4    X    X    X line5 → X Y5    X    X    X
    C3—O        C3—O line6 → X Y6    X    X    X line7 → X Y7    X    X    X
    C4—O        C4—O line8 → X Y8    X    X    X line9 → X Y9    X    X    X
    C5—O        C5—O line10 → X Y10    X    X    X

FIELD-BASED UPSAMPLING METHOD FOR PERFORMING ZOOM IN A DIGITAL VIDEO SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to video display systems. More particularly, the present invention relates to filtering of pixel data in a video display system. More particularly still, the invention relates to performing zoom operations on field-based images in a digital video system.

2. Background of the Invention

The consumer electronics industry has experienced a dramatic explosion in product development over the last 20 years. This explosion has been fueled by consumer demand coupled with significant advances in semiconductor technology that have lead to lower cost semiconductor devices incorporating significantly more functionality than previously possible. For example, a hand-held calculator from 20 years ago provided the ability to perform rudimentary mathematical operations. Today, a hand-held device can provide much of the functionality of a desktop computer system.

The visual display of information to the user is of particular importance to the consumer electronics industry. The most notable examples of visual displays include televisions and personal computers. Other types of consumer electronics, including stereo receivers and hand-held computers, also include visual displays. Typically, a visual display comprises a grid of "pixels" arranged in columns and rows. In a television format, the screen includes 720 columns and 480 rows of pixels.

Each pixel on the screen is represented by one or more data values that define the color of the pixel. Several standard formats are available for the pixel data values. For example, each pixel can be represented in a "RGB" format comprising a red color component, a green color component, and a blue component. Often, each red, green, and blue component is represented by an eight-bit value, thus requiring 24 bits to represent the entire RGB pixel value. Alternatively, each pixel can be represented in a "YUV" or "YCrCb" formats. In either the YUV or YCrCb format, the "Y" value represents luminance (or simply "luma") which is the brightness of an image. The U and V values represent chrominance (or simply "chroma") components and are calculated as the difference between the luminance components and the read and blue color values. That is, U=Y−R and V=Y−B. The Cr and Cb values also represent chrominance and are scaled U and V chrominance values.

The image displayed on a television monitor in each instance of time thus includes almost 350,000 pixels of information with each pixel represented by perhaps 24 bits (i.e. three bytes) of RGB or YCrCb values. In a television format, 30 frames of video are shown on the screen each seconds. Because of the extraordinary volume of data represented by motion video, compression techniques are important for the transmission and storage of video. One such compression technique is implemented by the MPEG standard ("Moving Pictures Experts Group").

The MPEG standard represents a set of methods for compression and decompression of full motion video images. MPEG compression uses both motion compensation and discrete cosine transform ("DCT") processes, among others, and can yield relatively high compression ratios. The YCrCb format for representing pixel color is the format specified by the MPEG standard.

The two predominant MPEG standards are referred to as MPEG-1 and MPEG-2. The MPEG-1 standard generally concerns inter-field data reduction using block-based motion in compensation prediction ("MCP"), which generally uses temporal differential pulse code modulation ("DCPM"). The MPEG-2 standard is similar to the MPEG-1 standard, but includes extensions to cover a wider range of applications, including interlaced digital video such as high definition television ("HDTV").

The MPEG format thus specifies various techniques for compressing motion video images. To display those images on a television or computer screen, the compressed images must be decompressed and then processed. The processing steps required after the images are decompressed includes one or more filtering steps. Video display systems, such as digital video disk (DVD) drives, usually include both horizontal and vertical filters. Horizontal filters process pixel data across a horizontal row of pixels. Vertical filters processed pixel data along a vertical column of pixels.

Video images may be represented in either a "frame" structure or a "field" structure format. In a frame structure, which is supported in the MPEG-1 standard, the entire 720×480 grid of pixels represents one instance in time. Thus, each 720×480 frame of pixels is captured at the same point in time. In a field structure format, each frames comprises two fields—an odd field and an even field. The odd field includes the odd numbered lines of pixels (i.e, lines 1, 3, 5, etc.) and the even field includes the even numbered lines (i.e., lines 2, 4, 6, etc.). The video system alternately displays the odd and even fields. Both fields thus are interlaced and displayed 30 times per second. Because these techniques are used for moving pictures, the odd fields are captured at slightly different points in time than the even fields.

It is often desirable to manipulate the size of a video image. For example, it may be desirable to zoom in on a portion of the video image. Accordingly, a processing technique is needed to increase the number of lines of pixels used to represent a portion of an image. One zoom technique that has been suggested involves simply copying pixels from the original image into adjacent pixel locations. Although fast, this technique results in inferior quality images. Thus, an improved zoom technique is needed.

Existing digital video systems generally implement various techniques for vertical filtering which generally requires combining or otherwise processing one line of pixel values with one or more other lines of pixel values. Such techniques generally and adequately process and entire frame of video data. Such vertical filtering techniques, however, are not sufficient to handle field structure images in which the odd lines of pixels were captured at a different point in time in the even lines of pixels. Because existing vertical filtering techniques do not take into account the time difference between portions of the image, such techniques thus effectively combine two distinct images representing different points in time. The quality of the resulting filtered image sufferers. The detrimental effect on the resulting image becomes more pronounced for images moving at higher speeds.

Thus, a video processing system is needed that is capable of performing zoom and other types of vertical processes on digital moving images. Further, such a technique should take into account the time difference between fields in a field-based video structure. Despite the advantages such a system would offer, today no such system is known to exist.

BRIEF SUMMARY OF THE INVENTION

The deficiencies noted above are solved in large part by a video processing system that processes vertical column of pixels from individual fields. As such, the video processing system processes pixels from an even field independent of the pixels in the odd field, and vice versa. The video processing system preferably includes a system memory for storing fields of input video images and a vertical filter coupled to the system memory via a data bus. The field data is retrieved from the system memory by the vertical filter and processed as individual fields.

In accordance with the preferred embodiment of the invention, the vertical filter preferably calculates a 2× enlargement of the input image, although the filter can be adapted to enlarge by different factors if desired. The 2× enlargement process generally involves representing an input image with twice as many lines of pixels values as the initial image. The values that are used to represent the enlarged pixels preferably are weighted averages of the pixels from an input field. The vertical filter calculates the weighted averages using coefficients that are based on the proximity of the resulting enlarged pixel locations to the corresponding pixel locations from the input field.

Thus, the preferred embodiments of the invention represent a method and apparatus for enlarging video images in a field-based video processing system. By processing fields rather than frames of video data, the problems noted above with conventional processing systems that do not take into account time differences between fields is avoided. These and other benefits will be fully appreciated once the following description is read in conjunction with the following figures.

BRIEF DESCRIPTION OF THE DRAWINGS

For a detailed description of the preferred embodiments of the invention, reference will now be made to the accompanying drawings in which:

FIG. 7 shows the relationship between luma and chroma values in a 4:2:0 picture format.

Certain terms are used throughout the following description and claims to refer to particular system components. As one skilled in the art will appreciate, video system companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
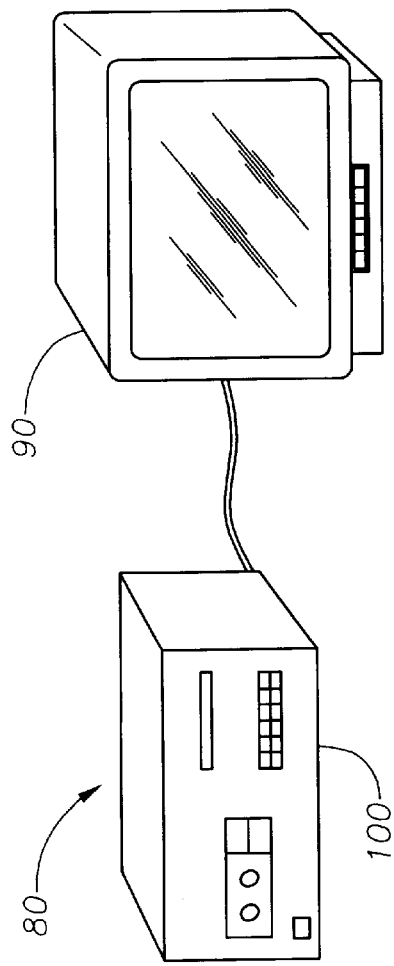
FIG. 1 shows a DVD drive connected to a display.

Referring now to FIG. 1, video system 80 constructed in accordance with the preferred embodiment generally includes a display device 90 coupled to a video player 100. Video player 100 will be described throughout this disclosure as a digital video disk (DVD) drive. The principles of the present invention, however, can be applied to other types of video equipment such as videocassette recorders and laser disc drives, to name a few. Moreover, the invention can be adapted to any type of video equipment that represents and processes video signals digitally. Display device 90 preferably is a television set or other type of monitor. Further, DVD drive 100 could be incorporated into a personal computer system and thus could be coupled to a computer display.

The invention generally is a technique for processing columns of pixel values (also referred to as "vertical filtering") in a field-based system. That is, odd and even fields are processed independently. The preferred embodiment of the invention will be described with regard to a "zooming" operation, and more particularly to a "2×" zoom in which a video image is enlarged by a factor of two. The principles of the invention, however, are applicable to other types of vertical filtering operations and the claims are intended to embrace all such operations.

Figure 2:
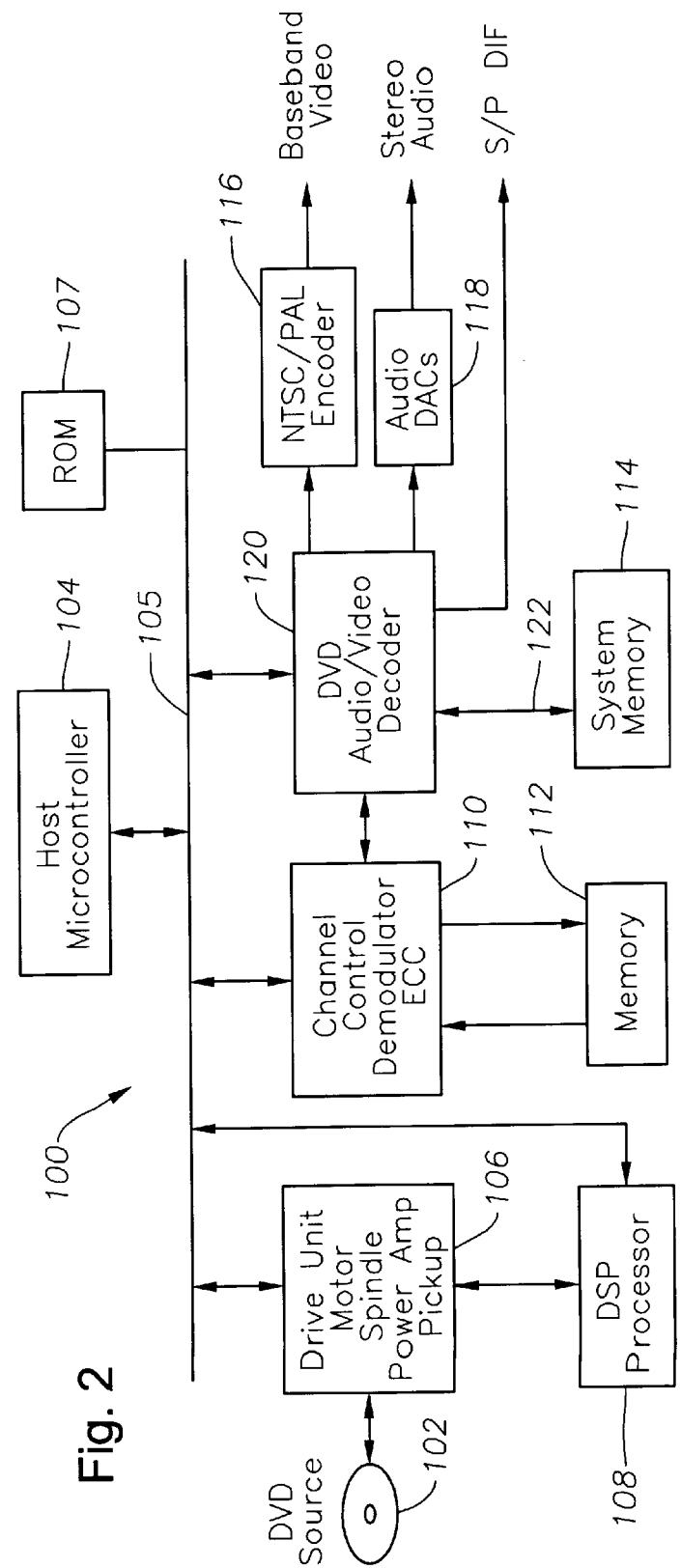
FIG. 2 is a block diagram of the DVD drive of FIG. 1 constructed in accordance with the preferred embodiment.

Referring now to FIG. 2, DVD system 100 preferably includes a host microcontroller 104, a drive unit motor/spindle power amplifier/pickup 106, read only memory (ROM) 107, a DSP processor 108, a channel controller demodulator/ECC 110, memory 112, system memory 114, NTSC/PAL encoder 116, audio digital-to-analog converters 118, and a DVD audio/video decoder 120. Alternatively, the audio and video processing functions of audio/video decoder 120 can be implemented with separate devices. Thus, audio/video decoder 120 can be replaced with a video processor, and an audio processor could be included as part of DVD drive 100 as a separate component.

The host microcontroller 104 couples to the drive unit motor spindle power amplifier pickup 106, DSP processor 108, channel control demodulator/ECC 110, and DVD audio/video decoder 120 via a bus 105 which includes data and address busses and status and control signals. The bus is implemented with any suitable protocol commonly available or custom designed. In accordance with the preferred embodiment, DVD system 100 is capable of receiving and processing MPEG video and audio data. The DVD system can implement either the MPEG-1 or MPEG-2 decoding techniques. Alternately, DVD system 100 can be adapted to process data compressed according to other techniques besides MPEG if desired.

A DVD disk 102 can be inserted into DVD system 100. The DVD audio/video decoder 120 generally receives demodulated, coded audio and video data from the DVD disk 102 through the channel control demodulator/ECC 110 and produces a decoded audio and video output data stream to the NTSC/PAL decoder 116 (for video) and audio digital-to-analog converters 118 (for audio). The DVD audio/video decoder 120 also provides a Sony/Philips digital interface (S/P DIF) formatted output stream which is a format commonly known to those of ordinary skill.

The host microcontroller 104 preferably can be any general purpose microcontroller, such as those made by Intel or Motorola. The host microcontroller 104 generally controls the operation of the DVD system. The microcontroller 104 executes an initialization routine to test the system's components during power up and responds to functions selected by the user through input controls (not shown).

The system memory 114 preferably is implemented as synchronous dynamic random access memory (SDRAM), although other types of memory devices can be used as well, such as conventional DRAM and extended data out DRAM (EDO DRAM). In accordance with the preferred embodiment, memory 114 comprises a SDRAM device with a 16 Mbit capacity and an 81 MHz clock speed capability. Examples of suitable SDRAM devices include the KM416S1120A manufactured by Samsung or the upD4516161 manufactured by NEC. Further, and if desired, memory 114 may be implemented as two or more SDRAM modules. Thus, if two 16 Mbit SDRAM devices are used, the total memory capacity of memory 114 is 32 Mbits.

The ROM 107 preferably is used to store on-screen display data as well as other configuration information and code. During system initialization, the host microcontroller 104 transfers a copy of the OSD data sets from ROM 107 across bus 105 through the DVD audio/video decoder 120 and into memory 114. The DVD audio/video decoder 120 receives video data from the channel control demodulator/ECC 110 and OSD data from memory 114. The DVD audio/video decoder 120 then mixes the OSD data with the video signals and provides a video output signal to the NTSC/PAL encoder 116.

Drive unit motor motor/spindle power amplifier/pickup 106 generally includes motors to spin the DVD disk 102 and includes read heads to read data from the disk 102. Drive unit motor 106 may also include write heads for writing data to disk 102. Any suitable type of drive unit motor motor/spindle power amplifier/pickup can be used.

Referring still to FIG. 2, the DSP processor 108 provides filtering operations for write and read signals, and acts a controller for the read/write components of the system (not specifically shown). The DSP controller 108 controls the drive motors included in the drive unit motor motor/spindle power amplifier/pickup 106. The DSP processor 108 may be implemented as any suitable DSP processor.

The channel controller demodulator/ECC 110 preferably decodes and buffers the read data from the DVD disk 102 in order to control the rate of the video and audio bitstreams. The channel controller demodulator/ECC 110 also includes an error correction code (ECC) decoder to decode the demodulated signal. Any suitable channel control demodulator/ECC can be used.

The NTSC/PAL encoder 116 receives processed digital video data from audio/video decoder 120 and generally converts the received video bitstream to a predefined analog format. The encoder 116 typically comprises an NTSC/PAL rasterizer for television, but may also be a digital-to-analog converter for other types of video formats. The audio digital to analog converts 118 receive a digital representation of the audio signal from the audio/video decoder 120 and, according to known techniques, converts the signal into an analog audio signal that can be played through a speaker.

Figure 3:
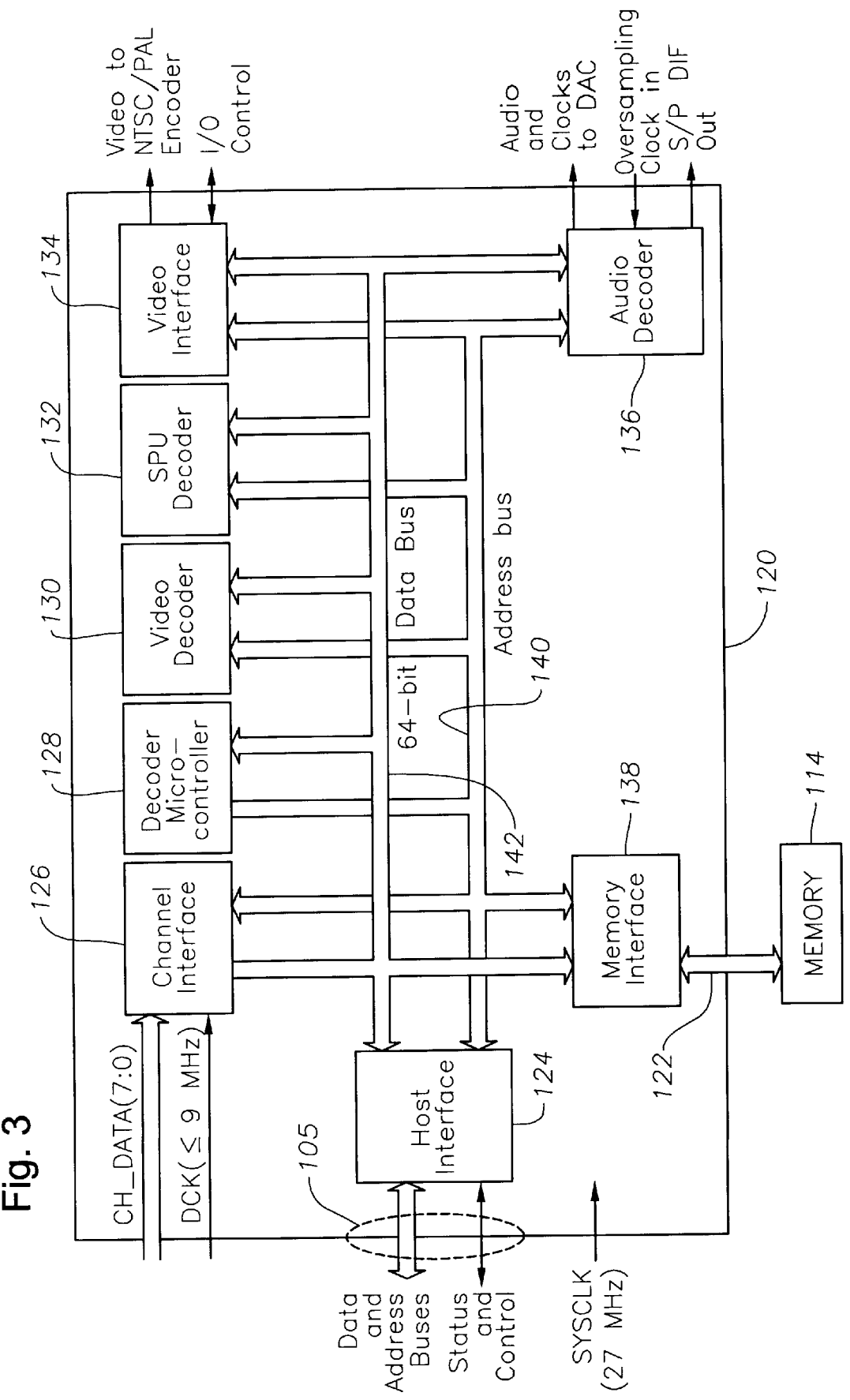
FIG. 3 shows a block diagram of a preferred embodiment of an audio/video decoder included in the DVD drive of FIG. 2.

Referring now to FIG. 3, the audio/video decoder 120 preferably includes a host interface 124, a channel interface 126, a decoder microcontroller 128, a video decoder 130, a sub-picture unit (SPU) decoder 132, a video interface 134, an audio decoder 136, and a memory interface 138. As shown, these components are coupled together via a 64-bit data bus 142 and an associated address bus 140. The interface to the channel control demodulator/ECC 110 is provided by the channel interface 126. The interface to bus 105, and thus host microcontroller 104 is provided by host interface 124. The memory interface 138 provides the interface for the decoder 120 to memory 114. The video interface 134 generates video data to be provided to NTSC/PAL encoder 116 and the audio decoder 136 generates the output digital audio data to be provided to digital-to-analog converters 118. Audio decoder 136 also generates the S/P DIF audio output stream. The following discussion describes functional units depicted in FIG. 3 relevant to the preferred embodiment in greater detail.

The host interface 124 preferably includes registers, read and write FIFO (first in first out) buffer is, and other logic (not shown) to permit the host microcontroller 104 to communicate with the audio/video decoder 120. Communication between the microcontroller 104 and decoder 120 preferably is through the use of the registers in the host interface 124, although other communication techniques can be implemented as well. In accordance with the preferred embodiment, the host microcontroller 104 writes video, audio, and configuration data and other status information to predefined registers and the host interface 124. The decoder 120 continuously or periodically monitors the registers for updated information and responds accordingly. Similarly, decoder 120 communicates information to the host microcontroller 104 through the use of the registers.

Referring still to FIG. 3, the channel interface 126 preferably accepts byte-wide MPEG data streams from the channel control demodulator ECC 110 (FIG. 4) over the CH_DATA[7:0] bus. The channel interface 126 indicates to the channel control demodulator ECC 110 that the channel interface 126 is ready to receiving new byte of encoded video or audio data. When the channel device 110 places the requested data on the CH_DATA bus, the channel device 110 asserts audio or video valid signals, a depending on whether the data to be transferred represents audio or video. These valid signals indicate that the requested data is available to the channel interface 126.

If desired, a DCK clock input signal may be provided to the channel interface 126. If implemented, the DCK signal preferably has a frequency of less than or equal to 9 MHz, although frequencies greater than 9 MHz can also be used. The DCK clock signal preferably is generated by the external channel device 110. The DCK clock signal, in conjunction with the valid signals, is used to write data synchronously to the channel interface 126. When the DCK clock input signal is connected to channel interface 126, the channel interface 126 uses the clock to synchronize the input valid signals before strobing the data into the channel interface 126. This method for inputting data into the channel interface 126 is preferred for connecting external channel devices 110 that do not have clean valid signals. Alternatively, the channel interface 126 can be configured for receiving audio and video data asynchronously. In the asynchronous mode, the DCK clock input pin preferably is grounded and the channel data is placed into the channel interface upon the assertion of request and valid control signals (not shown). As such, the data is not latched into the channel interface 126 synchronously with the DCK clock signal.

The channel interface 126 preferably also strips the packets of headers from the MPEG data stream and writes the header packet data payloads into separate buffer areas in memory 114. The host microcontroller 104 preferably defines a circular buffer within memory 114 by specifying the start and end addresses to each of the buffer areas in registers (not specifically shown). The channel interface 126 manages the reading and writing of each buffer defined in memory 114. When the channel interface 126 strips an item out of the bitstream, the decoder microcontroller 128 retrieves the current write location of the buffer area for that item and writes the item into the buffer.

The video decoder 130 generally receives MPEG video data from memory 114, performs "post-parsing" on the data, decompresses and decodes the data and stores the processed data back in memory 114 in video frame form. The post-parsing process strips off all header information and stores the header information in memory (not shown) for use in the decoding process. The channel interface 126 parses pack, system and packet headers from the MPEG bitstream and stores video packet payloads in memory 114. The prepared video data is read from the memory 114 into the channel interface 126.

The video decoder 130, along with the decoder microcontroller 128, performs post-parsing by stripping the bitstream apart, and passing the appropriate bits and fields in the stream to the microcontroller 128 for use in picture decoding and reconstruction. The video decoder 130 also decodes layer of syntax in the MPEG bitstream starting from the sequence layer and going through all of the lower layers including the group of picture layer, picture layer, slice layer, macro block layer and block layer, all of which are known to those skilled in the art.

Figure 4:
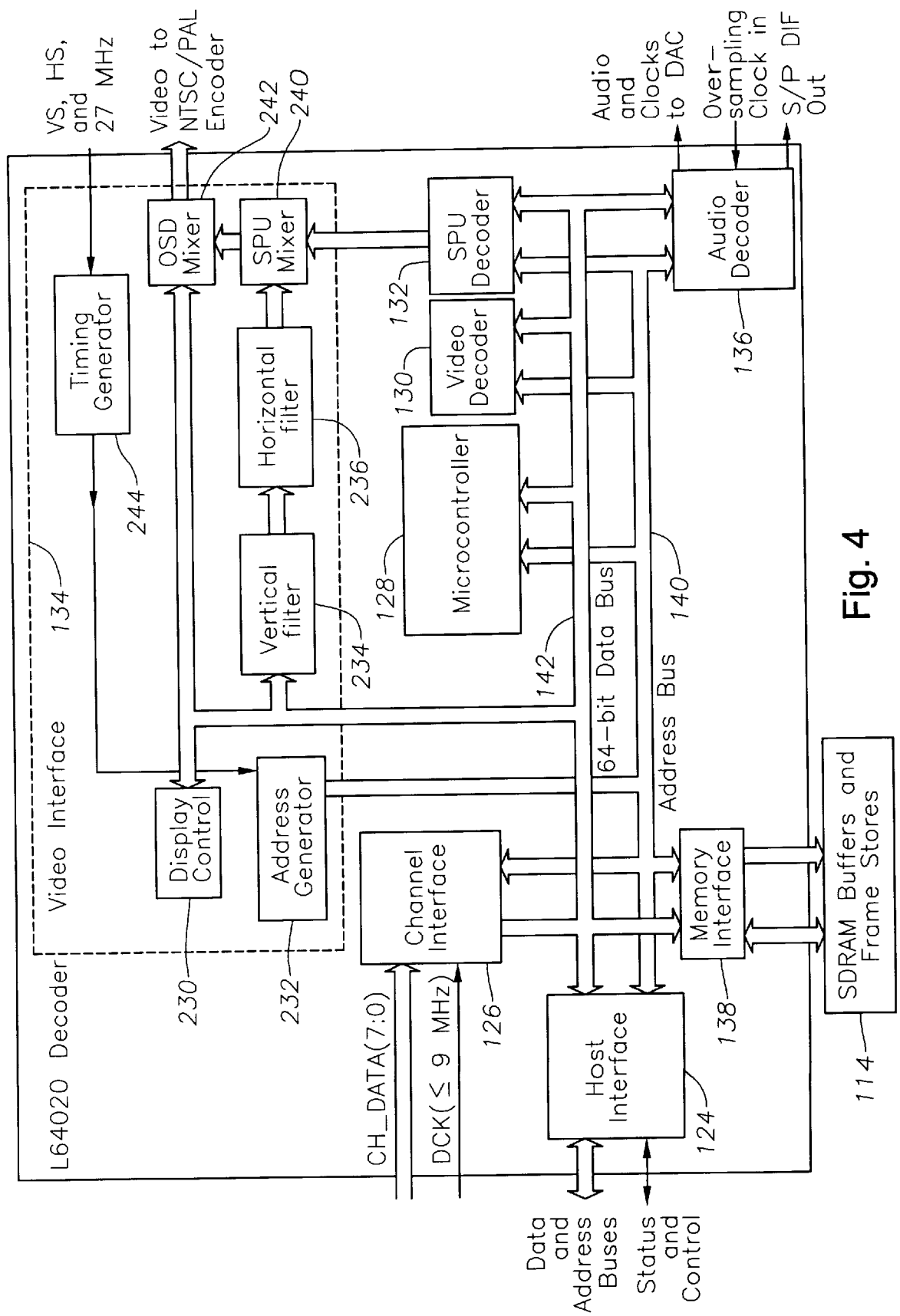
FIG. 4 is a block diagram of a video interface included in the audio/video decoder of FIG. 3.

The video decoder 130 also decodes the block layer data per instructions received from the decoder microcontroller 128. The results are placed in the frame stores of memory 114 as picture bitmaps. The video interface 134 reads the picture data from memory 114, mixes it with SPU and OSD video and sends the mixed data to be external NTSC/PAL encoder 116 (FIG. 4). The video decoder 130 also includes buffers that are used to store certain parameters from each of the layers of syntax. The data in these buffers (not specifically shown) is available through the registers included in the host interface 124 described above. In general, this data is useful for controlling the decoder 130.

Referring still to FIG. 3, the SPU decoder 132 decodes SPU bitstreams has defined in the DVD Specification for Read-only Disk. The SPU decoder 132 preferably controls both the memory 114 buffer pointers and various on-chip FIFO pointers. Further, SPU decoder 132 analyzes each SPU command and controls the entire SPU decoding schedule as well as decoding the pixel data compressed by run-length encoding techniques.

The memory interface 138 preferably configures memory 114 into a 512×16-bit page size with a page break penalty of 6 to 7 cycles. The memory interface preferably also implements a column address strobe (CAS) latency of 3 and a burst length of 4. The memory bus 122 preferably comprises a 16-bit data bus, a 12-bit address bus, various chip selects signals and other control signals as would be understood by those of ordinary skill in the art. The memory 114 preferably includes at least one SDRAM device, but may include one or more additional SDRAM's as desired. Many types of data may be stored in memory 114. For example, OSD graphics data, audio and video data, MPEG system header channel data, SPU channel data, and Navi Bank or private stream channel data may be stored in memory 114.

In accordance with the preferred embodiment, the decoder microcontroller 128 controls arbitration to memory 114. Memory arbitration is required because various devices and processes may concurrently require memory access. The arbitration algorithm gives higher priority to some devices requesting memory access and lower priority to others. The arbitration priority preferably favors the MPEG video decoder 130 and channel interface 126. The next highest priority is given to the SPU decoder 132. The next lowest priority is given to the host interface 124, block data move transactions, and direct memory access (DMA) data transfers. Lastly, memory refresh is given lowest priority. Other arbitration schemes can be implemented if desired.

Because the preferred memory configuration is 16 bits wide, the memory interface preferably performs the conversion between the 16-bit memory bus 122 to the 64-bit internal data bus of the audio/video decoder 120. The host microcontroller 104 and the decoder microcontroller 128 address memory 114 assuming an 8-byte wide data transfer configuration. The memory interface 138 changes these addresses to suitable chip selects, bank selects, and column and row addresses for the memory 114.

Referring now to FIG. 4, the video interface 134 preferably includes a display control 230, an address generator 232, a vertical filter unit 234, a horizontal filter unit 236, an SPU mixer 240, an OSD mixer 242, and a timing generator 244. The address generator 232, under control of the timing generator 244, addresses the video frames stored in memory 114 to read pixel data into the post-processing filters 234, 236, and 238. The address generator 232 also commands display control 230 and reads OSD bitmap data into the OSD mixer 242. The post-processing filters 234, 236, and 238 modify the pixel data based on instructions from the display control 230 to perform various video operations such as "letter boxing," "3:2 pulldown, "pan and scan."

The display control 230 sets the location of the video image on the display 90 (FIG. 2) with respect to sync signals (not shown) to account for the requirements of several different timing systems and display modes. The output signal from horizontal interpolation filter 238 is then processed by SPU mixer 240 which adds SPU data from the SPU decoder 132 to the video data stream from filter 238.

The OSD mixer 242 mixes together the processed video data from SPU mixer 240 with an OSD image retrieved from memory 114. The output data stream from OSD mixer 242 is then provided to NTSC/PAL encoder 116 (FIG. 4).

Figure 5:
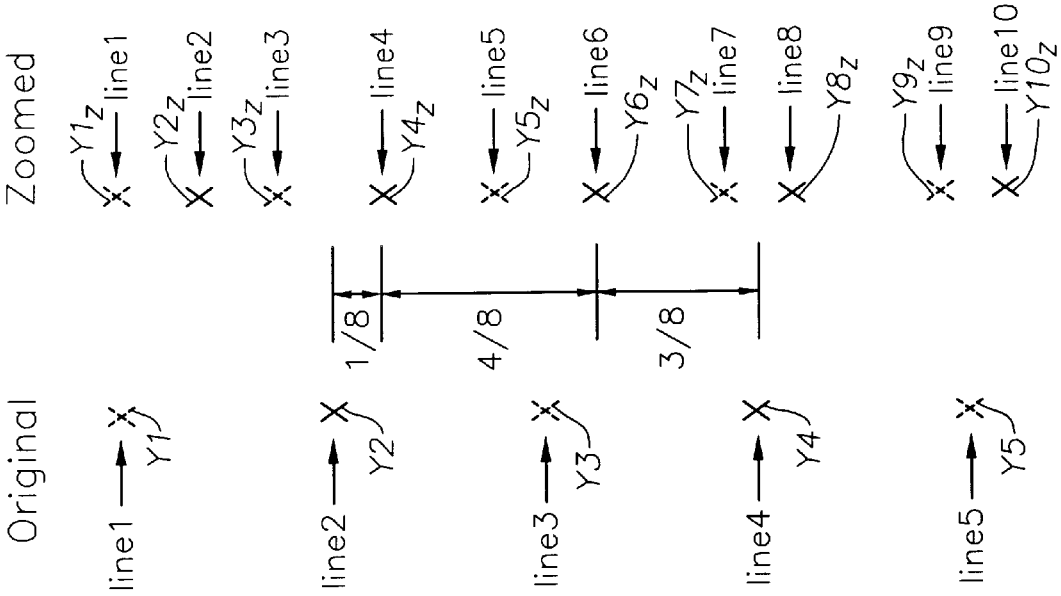
FIG. 5 shows the preferred method for zooming the odd field.
Figure 6:
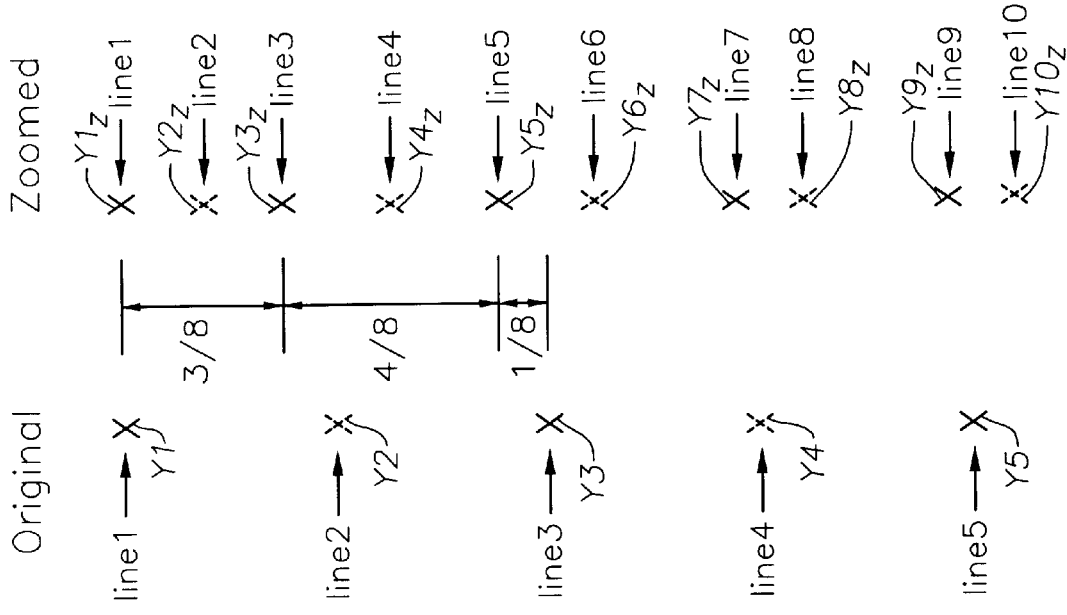
FIG. 6 shows the preferred method for zooming the even field.

The preferred embodiment for independently zooming the luminance (luma) components of the odd and even fields is illustrated in FIGS. 5 (odd field) and 6 (even field). Filtering the chrominance (chroma) components in the odd and even fields follows a similar format and will be explained further below. The X's in FIGS. 5 and 6 represent the locations of luma components in the pixel grid.

Referring first to FIG. 5, the luma components from the original (unzoomed) image are shown as lumas Y1, Y2, Y3, Y4, and Y5. These lumas, Y1–Y5 preferably correspond to lines 1–5 of the display. These luma values represent a portion of a single vertical column of luma values and are used to illustrate the vertical filtering technique of the preferred embodiment. The technique is substantially the same for all other columns of lumas on the screen.

The filtered (zoomed) lumas are shown to the right as lumas $Y1_Z$–$Y10_Z$, where the subscript "z" indicates the luma is a "zoomed" (2×) luma value. These 10 lumas, $Y1_Z$–$Y10_Z$, correspond to lines 1–10. The original five lines of lumas have been expanded to 10 lines of lumas, thus illustrating the preferred embodiment for performing a 2× zoom. To illustrate the preferred method for processing the odd field in FIG. 5, the lumas corresponding to the odd lines are shown in solid line, with the even lumas shown in dashed line.

In accordance with the preferred embodiment, odd lumas $Y3_Z, Y5_Z, Y7_Z,$ and $Y9_Z$ are calculated as weighted averages of original lumas Y1, Y3, and Y5. The coefficients used in the weighted averages are determined from the vertical proximity of each averaged (zoomed) luma to the two original lumas averaged together. For example, lumas $Y3_Z$ and $Y5_Z$ are calculated as a weighted average of original lumas Y1 and Y3. As shown in FIG. 5, luma $Y3_Z$ is positioned at a location that is 3/8 of distance between luma Y1 and Y3. Thus, new luma $Y3_Z$ is closer to original luma Y1 than luma Y3 and the weighted average calculation of luma $Y3_Z$ therefore weights original Y1 more than luma Y3. The weighted average reflects the relatively close proximity of luma $Y3_Z$ to luma Y1 by weighting original luma Y1 by 5/8 and original luma Y3 by 3/8. Thus, the value of new luma $Y3_Z$ is calculated 5/8*Y1+3/8*Y3.

Further, because luma $Y5_Z$ is closer to original luma Y3 than Y1 (only 1/8 away from luma Y3 in the example of FIG. 5), original luma Y3 is weighted by a factor of 7/8 compared to a weight of 1/8 for luma Y1. Thus, the value of luma $Y5_Z$ is calculated as 7/8*Y3+1/8*Y1. The left half of Table I below shows how all of the lumas are calculated in the odd field in accordance with the preferred embodiment of the invention. As shown, the coefficients used in the calculations reflect the proximity along a column of pixels between the newly calculated luma and the two original lumas used in the averaging calculation. The choice of coefficients in Table I is preferred, but other coefficients are possible as well. The new luma for line 1 (luma $Y1_Z$) preferably is not averaged, but rather simply is the same value as original luma Y1.

TABLE I

A similar process can be used if desired to process the even field as shown in FIG. 6. In FIG. 6 the even luma components are shown in sold line and the odd lumas are shown in dashed line for convenience. As shown, luma $Y4_Z$, for example, is located close to Y2 at a relative distance of 1/8 of the Y2-to-Y4 distance. Thus, the averaging equation used to calculate luma $Y4_Z$ weights original luma Y2 by a factor of 7/8 and luma Y4 by a factor of 1/8. The right hand side of Table I reflects the coefficients used to calculate all of the even lumas from the even field.

A similar process is used to perform a vertical zoom operation on chroma values. FIG. 7 shows the orientation of lumas Y1–Y10 (X's) and chromas C1–C5 (open circles) as stored in system memory 114. The format shown depicts a 4:2:0 format in which there is one chroma component for every four luma components with chromas located between lines of luma components. In accordance with the preferred embodiment of the invention, chroma values are calculated to correspond to actual lines of pixels in conjunction with a 2× zoom. Both operations are accomplished by the equations shown below in Table II, although the locations of the resulting chromas are not shown in FIG. 7. As shown in the Table, weighted averages of chroma values are calculated for each field (odd and even) independently.

TABLE II

Interlaced Chroma Fields

| Odd Line # | Odd Chroma Value | Even Line # | Even Chroma Value |
|---|---|---|---|
| 1 | C1 | 2 | C2 |
| 3 | 15/16*C1 + 1/16*C3 | 4 | C2 |
| 5 | 11/16*C1 + 5/16*C3 | 6 | C2 |
| 7 | 7/16*C1 + 9/16*C3 | 8 | 13/16*C2 + 3/16*C4 |
| 9 | 3/16*C1 + 13/16*C3 | 10 | 9/16*C2 + 7/16*C4 |
| 11 | 15/16*C1 + 1/16*C3 | 12 | 5/16*C2 + 11/16*C4 |
| 13 | 11/16*C1 + 5/16*C3 | 14 | 1/16*C2 + 15/16*C4 |
| . | . | . | . |
| . | . | . | . |
| . | . | . | . |
| 469 | 11/16*C117 + 5/16*C119 | 470 | 1/16*C116 + 15/16*C118 |
| 471 | 7/16*C117 + 9/16*C119 | 472 | 13/16*C119 + 3/16*C120 |
| 473 | 3/16*C117 + 13/16*C119 | 474 | 9/16*C118 + 7/16*C120 |
| 475 | C119 | 476 | 5/16*C118 + 11/16*C120 |
| 477 | C119 | 478 | 1/16*C118 + 15/16*C120 |
| 479 | C119 | 480 | C120 |

Interlaced Luma Fields

| Odd Line # | Odd Luma Value | Even Line # | Even Luma Value |
|---|---|---|---|
| 1 | Y1 | 2 | Y2 |
| 3 | 5/8*Y1 + 3/8*Y3 | 4 | 7/8*Y2 + 1/8*Y4 |
| 5 | 1/8*Y1 + 7/8*Y3 | 6 | 3/8*Y2 + 5/8*Y4 |
| 7 | 5/8*Y3 + 3/8*Y5 | 8 | 7/8*Y4 + 1/8*Y6 |
| 9 | 1/8*Y3 + 7/8*Y5 | 10 | 3/8*Y4 + 5/8*Y6 |
| . | . | . | . |
| . | . | . | . |
| . | . | . | . |
| 475 | 5/8*Y237 + 3/8*Y239 | 476 | 7/8*Y238 + 1/8*Y240 |
| 477 | 1/8*Y237 + 7/8*Y239 | 478 | 3/8*Y238 + 5/8*Y240 |
| 479 | Y239 | 480 | Y240 |

Preferably, the vertical filter (FIG. 4) calculates the weighted averages shown in Tables I and II. The vertical filter receives the original lumas and/or chroma values from system memory 114, via the memory interface 138 and data bus 142, and multiplies the video values by appropriate coefficients as described above. The coefficients may be stored in a buffer (not shown) in vertical filter 234 or in another storage device of the audio/video decoder 120. Alternatively, the averaging equations can be implemented in boolean combinational logic that hard wires" the coefficients.

Thus, the preferred embodiment of the invention is a method for manipulating vertical columns of pixel data in both the even and odd fields independently. The preferred embodiment described a 2× zoom operation, although other types of zoom operations can be performed using the techniques described herein. Further, the preferred embodiment can be extended to other types of field-based vertical filtering operations such as chroma upsampling from the 4:2:0 to either the 4:2:2 or 4:4:4 formats.

The above discussion is meant to be illustrative of the principles of the present invention. Numerous variations and modifications will become apparent to those skilled in the art once the above disclosure is fully appreciated. It is intended that the following claims be interpreted to embrace all such variations and modifications.

What is claimed is:

1. A video processing system for processing video values that represent a plurality of lines of pixel values in a field-based structure, comprising:
   a host microcontroller;
   a system memory that stores even and odd fields of video data; and
   a vertical filter that receives at least a portion of a column of initial pixel values and calculates weighted averages of said initial pixel values to calculate individual fields of pixel values representative of an enlarged image of said initial pixel values, and where said vertical filter increases the number of pixel lines used to represent the initial pixel values;
   said weighted averages calculated using coefficients that are based on the relative proximity of the lines of pixels representing said enlarged image to the location of the lines representing said initial pixel values, said coefficients selected from the group consisting of $3/8$, $5/8$, $1/8$, and $7/8$;
   wherein said vertical filter performs a 2× zoom on said initial pixel values.

2. A method of enlarging an input digital video image to generate an enlarged output image comprising:
   reading initial pixel values representing the video image to be enlarged from a system memory;
   increasing the number of pixels used to represent the video image to be enlarged;
   calculating weighted averages of the initial pixel values by multiplying a first initial pixel value by a coefficient selected from the group consisting of $5/8$, $1/8$, $15/16$, $11/16$, $7/16$, and $3/16$ and a second initial pixel value by a coefficient selected from the group consisting of $3/8$, $7/8$, $1/16$, $5/16$, $9/16$, and $13/16$ and adding the resulting products together; and
   applying said weighted averages to said increased number of pixels to produce newly calculated pixel values.

* * * * *